(12) United States Patent
Shiogai et al.

(10) Patent No.: US 11,008,053 B2
(45) Date of Patent: May 18, 2021

(54) AERODYNAMIC COMPONENT FOR AUTOMOBILES

(71) Applicant: HONDA ACCESS CORP., Niiza (JP)

(72) Inventors: Ryo Shiogai, Niiza (JP); Takashi Yuzawa, Niiza (JP); Seiko Fukuda, Niiza (JP)

(73) Assignee: HONDA ACCESS CORP., Niiza (JP)

( * ) Notice: Subject to any disclaimer, the term of this patent is extended or adjusted under 35 U.S.C. 154(b) by 62 days.

(21) Appl. No.: 16/489,807

(22) PCT Filed: Nov. 27, 2017

(86) PCT No.: PCT/JP2017/042433
§ 371 (c)(1),
(2) Date: Aug. 29, 2019

(87) PCT Pub. No.: WO2018/163528
PCT Pub. Date: Sep. 13, 2018

(65) Prior Publication Data
US 2020/0010130 A1    Jan. 9, 2020

(30) Foreign Application Priority Data
Mar. 6, 2017   (JP) .............................. JP2017-041939

(51) Int. Cl.
*B62D 35/00*      (2006.01)
*B62D 25/04*      (2006.01)
*B62D 37/02*      (2006.01)

(52) U.S. Cl.
CPC ........... *B62D 35/008* (2013.01); *B62D 25/04* (2013.01); *B62D 37/02* (2013.01)

(58) Field of Classification Search
CPC ...... B62D 35/008; B62D 25/04; B62D 37/02; B62D 35/007; Y02T 10/82; B60R 13/04
(Continued)

(56) References Cited

U.S. PATENT DOCUMENTS 2,021,784 A * 11/1935 Hochstadt .............. B62D 57/04
180/7.4
3,591,229 A *  7/1971 Wilfert ................. B60Q 1/0005
296/91

(Continued)

FOREIGN PATENT DOCUMENTS

DE        4026518 A1    3/1991
JP       57-143985 U    9/1982
(Continued)

OTHER PUBLICATIONS

International Search Report dated Feb. 6, 2018, issued in counterpart International Application No. PCT/JP2017/042433 (2 pages).

*Primary Examiner* — Pinel E Romain
(74) *Attorney, Agent, or Firm* — Westerman, Hattori, Daniels & Adrian, LLP

(57) ABSTRACT

An aerodynamic component disposed on a side face of an upper rear part of an automobile vehicle body and reduces a lift coefficient of a vehicle body rear part, includes a plate-shaped base part and a fin projectingly provided on a front face of the base part, wherein the base part gently increases in thickness from a front edge side to a rear edge side, and has at the rear edge a shape that rises steeply with respect to the side face of the upper rear part of the vehicle body.

8 Claims, 6 Drawing Sheets

(58) Field of Classification Search
USPC .................................................. 296/180.1
See application file for complete search history.

(56) References Cited

U.S. PATENT DOCUMENTS

| | | | | |
|---|---|---|---|---|
| 4,838,603 | A * | 6/1989 | Masoero | B60Q 1/0005 |
| | | | | 296/180.1 |
| 5,018,779 | A | 5/1991 | Lund | |
| 5,407,245 | A * | 4/1995 | Geropp | B61D 17/02 |
| | | | | 296/180.1 |
| 5,538,315 | A | 7/1996 | Dixon | |
| 5,927,795 | A * | 7/1999 | Townend | B62D 37/02 |
| | | | | 180/903 |
| 6,669,270 | B1 | 12/2003 | Card et al. | |
| 8,297,393 | B2 * | 10/2012 | Froeschle | B60K 13/02 |
| | | | | 180/68.1 |
| 9,738,330 | B2 * | 8/2017 | Wolf | B62D 37/02 |
| 2009/0302639 | A1 * | 12/2009 | Neale | B62D 35/00 |
| | | | | 296/180.1 |
| 2013/0119703 | A1 | 5/2013 | Fujii et al. | |
| 2013/0228236 | A1 | 9/2013 | Evans | |
| 2016/0280287 | A1 | 9/2016 | Fujii et al. | |
| 2019/0061826 | A1 * | 2/2019 | Kaneko | B62D 25/04 |
| 2019/0382063 | A1 * | 12/2019 | McAfee | B60J 10/767 |
| 2020/0369331 | A1 * | 11/2020 | Ferri | B62D 35/008 |

FOREIGN PATENT DOCUMENTS

| | | |
|---|---|---|
| JP | 7-25368 A | 1/1995 |
| JP | 8-99550 A | 4/1996 |
| JP | 2000-55014 A | 2/2000 |
| JP | 2012-206651 A | 10/2012 |
| JP | 2013-86571 A | 5/2013 |
| JP | 2015-48024 A | 3/2015 |
| JP | 5680630 B2 | 3/2015 |
| JP | 2015-83459 A | 4/2015 |

* cited by examiner

AERODYNAMIC COMPONENT FOR AUTOMOBILES

TECHNICAL FIELD

The present invention relates to an aerodynamic component that is disposed on a side face of an upper rear part of a vehicle body of an automobile and reduces a lift coefficient of a rear part of the vehicle body.

BACKGROUND ART

An arrangement in which a flow-alignment fin having a predetermined shape is provided on a side part of a vehicle body of an automobile, the flow-alignment fin aligns the flow of air therearound to thus increase the flow velocity, and the main flow around the vehicle body is thus made to be closer to the side part of the vehicle body thereby improving the stability and reducing the air resistance is known from Patent Document 1 below.

RELATED ART DOCUMENTS

Patent Documents

Patent Document 1: Japanese Patent No. 5680630

SUMMARY OF THE INVENTION

Problems to be Solved by the Invention

While an automobile is traveling, air flowing along the surface of a vehicle body becomes detached, the air thus detached swirls on a rear face of the vehicle body to thus generate a dead air region having a low pressure, and the difference in pressure between a front face of the vehicle body having a high pressure and the rear face of the vehicle body having a low pressure increases the pressure drag, thus causing the problem that the fuel consumption is degraded. In order to reduce the pressure drag of the automobile, minimizing the occurrence of a dead air region by streamlining the vehicle body shape is effective. However, if the vehicle body shape is streamlined, an upward lift occurs on the vehicle body, and this lift reduces the ground load of the wheels, thus causing the problem that the handling stability of the vehicle is degraded.

The magnitude of lift acting on a vehicle body is expressed as a lift coefficient; when the lift coefficient is a positive value the vehicle body is lifted from the road surface and the ground load decreases, and when the lift coefficient is a negative value the vehicle body is pressed against the road surface and the ground load increases. In the graph shown in FIG. 6 the abscissa is a lift coefficient $CLf$ of a vehicle body front part and the ordinate is a lift coefficient $CLr$ of a vehicle body rear part. The lift coefficient $CLf$ of the vehicle body front part can be calculated from a change in the ground load of a front wheel accompanying travel of the vehicle, and the lift coefficient $CLr$ of the vehicle body rear part can be calculated from a change in the ground load of a rear wheel accompanying travel of the vehicle. In general, the lift coefficient $CLr$ of the vehicle body rear part is larger than the lift coefficient $CLf$ of the vehicle body front part, and there is a tendency for the ground load of the rear wheel to become insufficient with respect to the ground load of the front wheel, but making the lift coefficient $CLf$ of the vehicle body front part and the lift coefficient $CLr$ of the vehicle body rear part substantially coincide with each other enables the handling stability of the vehicle to be enhanced.

The ideal characteristics in the graph of FIG. 6 are in a state in which, on an equivalent lift line where the lift coefficient $CLr$ of the vehicle body rear part=the lift coefficient $CLf$ of the vehicle body front part, the lift coefficient $CLr$ of the vehicle body rear part and the lift coefficient $CLf$ of the vehicle body front part are slightly negative values so that the front wheel and the rear wheel are pressed against the road surface. In Comparative Example 1, the lift coefficient $CLr$ of the vehicle body rear part is excessively large, and there is the problem that the ground load of the rear wheel is greatly insufficient. Comparative Example 2 is one in which a rear spoiler is added to Comparative Example 1 and the shape of an under cover is improved, the lift coefficient $CLr$ of the vehicle body rear part being decreased. Comparative Example 3 is one in which the shape of a bumper is improved, and the lift coefficient $CLr$ of the vehicle body rear part is further decreased. However, in all of the Comparative Examples the lift coefficient $CLr$ of the vehicle body rear part is excessively larger than the ideal characteristics, and there is room for further improvement.

The present invention has been accomplished in light of the above circumstances, and it is an object thereof to provide an aerodynamic component for automobiles that can reduce effectively the lift coefficient of a rear part of a vehicle body.

Means for Solving the Problems

In order to attain the above object, according to a first aspect of the present invention, there is provided an aerodynamic component for automobiles, the aerodynamic component, which is disposed on a side face of an upper rear part of an automobile vehicle body and reduces a lift coefficient of a vehicle body rear part, comprising a plate-shaped base part and a fin projectingly provided on a front face of the base part, wherein the base part gently increases in thickness from a front edge side to a rear edge side, and has at the rear edge a shape that rises steeply with respect to the side face of the upper rear part of the vehicle body.

Further, according to a second aspect of the present invention, in addition to the first aspect, the aerodynamic component is disposed on a surface of a rear pillar of the automobile, and the rear edge of the base part, which is formed into a linear shape, is inclined from lower front to upper rear or from upper front to lower rear.

Furthermore, according to a third aspect of the present invention, in addition to the first or second aspect, the fin comprises a plurality of first fins extending in a fore-and-aft direction, and the plurality of first fins are arranged side by side in an up-and-down direction so as to be parallel to each other.

Moreover, according to a fourth aspect of the present invention, in addition to the third aspect, the fin comprises a single second fin extending in the fore-and-aft direction, the second fin is disposed along an upper edge of the base part, and a length of the second fin in the fore-and-aft direction is larger than a length of the first fin in the fore-and-aft direction.

Further, according to a fifth aspect of the present invention, in addition to any one of the first to fourth aspects, the front face and a reverse face of the base part form an angle of about 20° at the front edge.

Furthermore, according to a sixth aspect of the present invention, in addition to any one of the first to fifth aspects, the lift coefficient of the vehicle body rear part that has been reduced by the aerodynamic component substantially coincides with a lift coefficient of a vehicle body front part.

Moreover, according to a seventh aspect of the present invention, in addition to any one of the first to sixth aspects, the aerodynamic component is detachably fixed to the vehicle body.

Further, according to an eighth aspect of the present invention, in addition to any one of the first to sixth aspects, the aerodynamic component is formed integrally with the vehicle body.

A first fin 15 and a second fin 16 of an embodiment correspond to the fin of the present invention.

Effects of the Invention

In accordance with the first aspect of the present invention, since the aerodynamic component disposed on the side face of the upper rear part of the automobile vehicle body and reducing the lift coefficient of the vehicle body rear part includes the plate-shaped base part and the fin projectingly provided on the front face of the base part, and the base part gently increases in thickness from the front edge side to the rear edge side and has at the rear edge a shape that rises steeply with respect to the side face of the upper rear part of the vehicle body, it is possible for the aerodynamic component to generate a turbulent vortex in the air flow passing the vehicle body upper rear part to thus decrease the lift coefficient of the vehicle body rear part and ensure the ground load for the rear wheel, thereby enabling the handling stability of the vehicle to be enhanced. Moreover, stabilizing the turbulent vortex on opposite side faces of the vehicle body by means of the fin provided on the base part not only reduces the lateral deflection of the vehicle body and improves the susceptibility to external disturbance but also suppresses eddies dragged around from the vehicle body side face to the vehicle body rear face and minimizes the occurrence of a dead air region, thus contributing to a reduction in the pressure drag.

Furthermore, in accordance with the second aspect of the present invention, since the aerodynamic component is disposed on the surface of the automobile rear pillar, and the rear edge of the base part formed into a linear shape is inclined from lower front to upper rear or from upper front to lower rear, not only is it possible to arrange the aerodynamic component with a good appearance with respect to the rear pillar or the rear combination lamp, but it is also possible to generate effectively a turbulent vortex in the air flow passing the vehicle body upper part, thus decreasing the lift coefficient of the vehicle body rear part.

Moreover, in accordance with the third aspect of the present invention, since the fin includes the plurality of first fins extending in the fore-and-aft direction, and the plurality of first fins are arranged side by side in the up-and-down direction so as to be parallel to each other, it is possible for the first fin to stabilize a turbulent vortex generated by the aerodynamic component, thus further reducing the lateral deflection of the vehicle body.

Furthermore, in accordance with the fourth aspect of the present invention, since the fin includes the single second fin extending in the fore-and-aft direction, the second fin is disposed along the upper edge of the base part, and the length of the second fin in the fore-and-aft direction is larger than the length of the first fin in the fore-and-aft direction, it is possible for the second fin to further stabilize a turbulent vortex generated by the aerodynamic component, thus enhancing the straight-line travel performance of the vehicle body.

Moreover, in accordance with the fifth aspect of the present invention, since the angle formed between the front face and the reverse face of the base part at the front edge is about 20°, it is possible to balance well the lift coefficient of the vehicle body rear part and the lift coefficient of the vehicle body front part.

Furthermore, in accordance with the sixth aspect of the present invention, since the lift coefficient of the vehicle body rear part that has been decreased by means of the aerodynamic component substantially coincides with the lift coefficient of the vehicle body front part, it is possible to optimally balance the lift coefficient of the vehicle body rear part and the lift coefficient of the vehicle body front part, thus further enhancing the handling stability of the vehicle.

Moreover, in accordance with the seventh aspect of the present invention, since the aerodynamic component is detachably fixed to the vehicle body, not only is it possible to attach the aerodynamic component to an existing vehicle body afterward to thus easily improve the aerodynamic characteristics, but it is also possible to easily detach it from the vehicle body when it becomes unnecessary.

Furthermore, in accordance with the eighth aspect of the present invention, since the aerodynamic component is formed integrally with the vehicle body, it is possible to improve the aerodynamic characteristics of the vehicle without increasing the number of components.

EXPLANATION OF REFERENCE NUMERALS AND SYMBOLS

11 Aerodynamic component
12 Rear pillar
14 Base part
14*a* Upper edge
14*b* Front edge
14*c* Rear edge
14*d* Front face
14*e* Reverse face
15 First fin (fin)
16 Second fin (fin)
CLf Lift coefficient of vehicle body front part
CLr Lift coefficient of vehicle body rear part

MODES FOR CARRYING OUT THE INVENTION

An embodiment of the present invention is explained below by reference to FIG. 1 to FIG. 6. In the present Description, the fore-and-aft direction, the left-and-right direction (vehicle width direction), and the up-and-down direction are defined on the basis of an occupant seated on a driving seat.

First Embodiment

Figure 1:
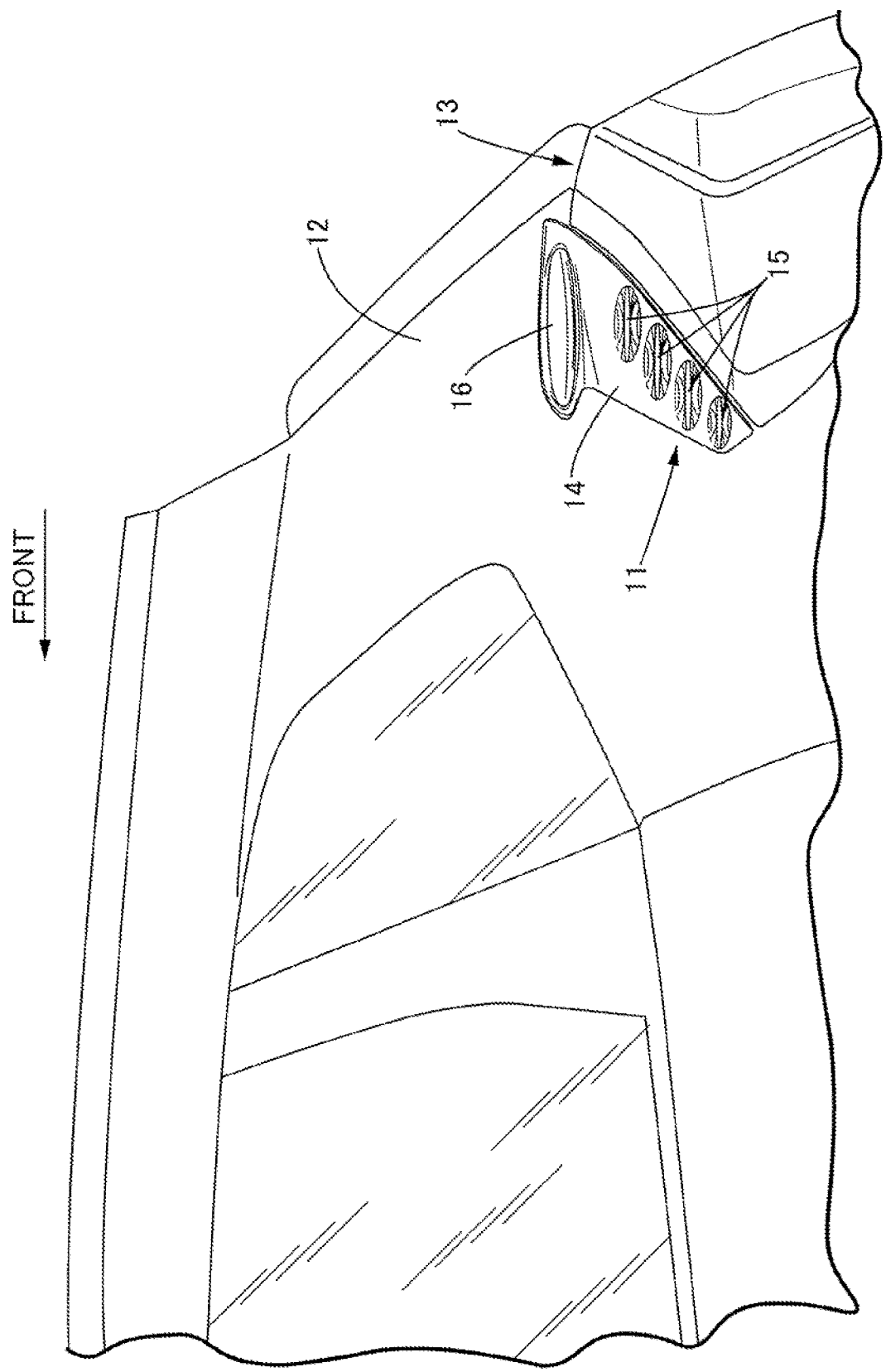
FIG. 1 is a side view of a rear part of a vehicle body of an automobile. (first embodiment)

As shown in FIG. 1, an aerodynamic component 11 of the present embodiment is mounted on an outer face of a rear pillar 12 provided at the rearmost part of a side face of a vehicle body of a hatchback type automobile, at a position higher than a half of the vehicle height, specifically a position along the front edge of a rear combination lamp 13.

Figure 2:
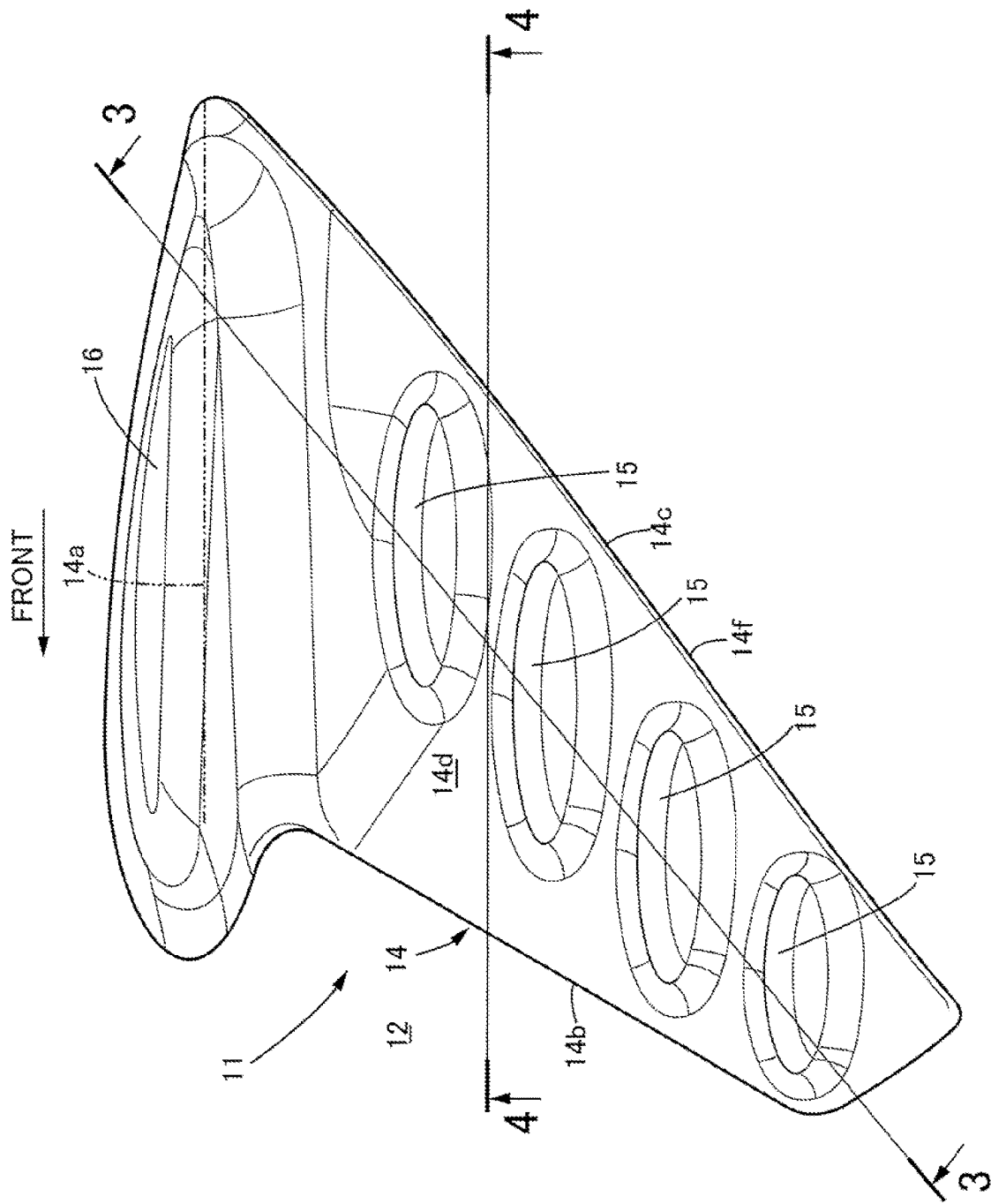
FIG. 2 is a side view of an aerodynamic component. (first embodiment)
Figure 3:
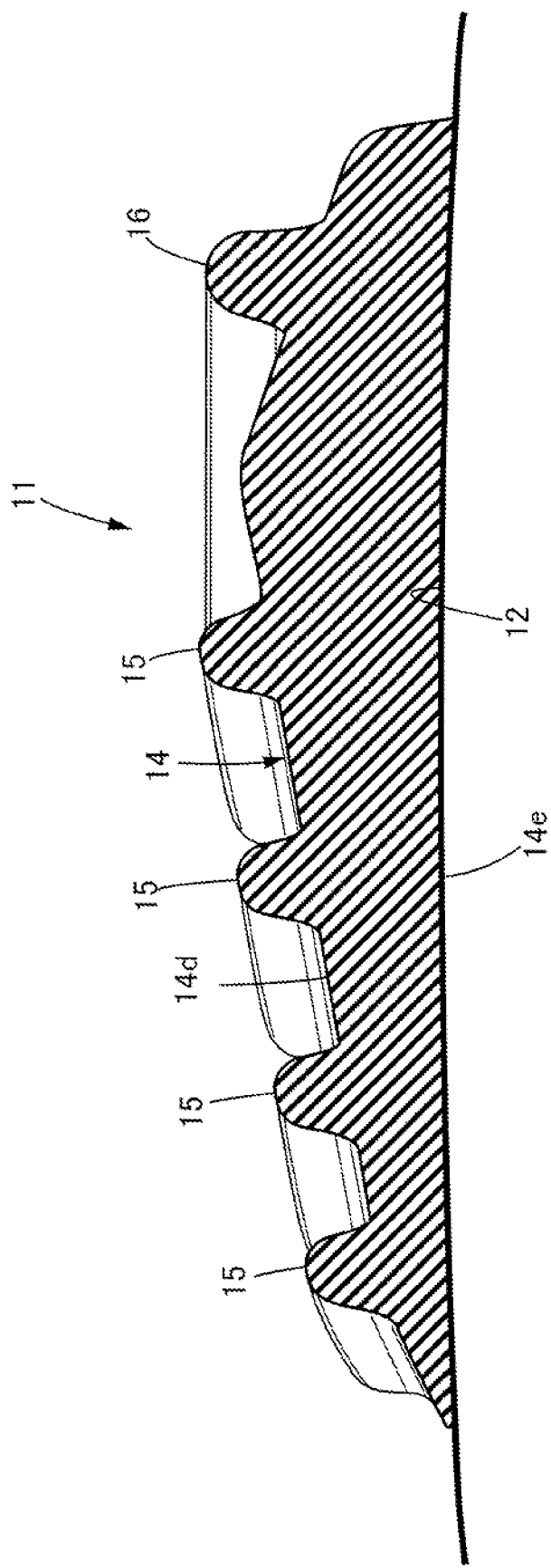
FIG. 3 is a sectional view along line 3-3 in FIG. 2. (first embodiment)
Figure 4:
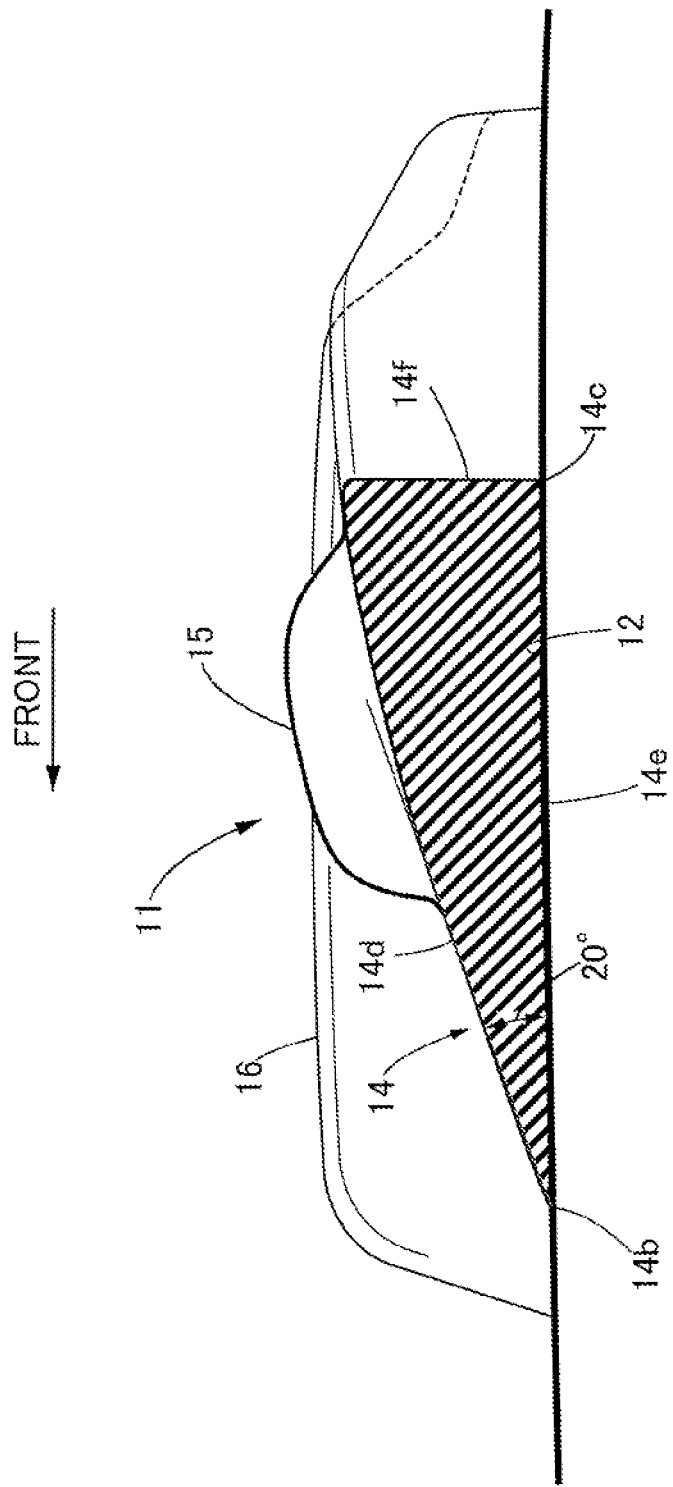
FIG. 4 is a sectional view along line 4-4 in FIG. 2. (first embodiment)

As shown in FIG. 2 to FIG. 4, the aerodynamic component 11 is a single component made of a flexible synthetic resin, and includes a substantially triangular plate-shaped base part 14 having an upper edge 14a, a front edge 14b and a rear edge 14c. The front edge 14b and the rear edge 14c of the base part 14, which have a substantially linear shape, are disposed so as to be inclined from lower front to upper rear, and the gap in the fore-and-aft direction between the front edge 14b and the rear edge 14c gradually increases in going from bottom to top. The upper edge 14a, which connects upper ends of the front edge 14b and the rear edge 14c, is disposed in the fore-and-aft direction.

The base part 14 is formed so as to have a wedge-shaped cross section having a front face 14d, a reverse face 14e and a rear face 14f that are substantially flat, and the reverse face 14e is mounted on the outer face of the rear pillar 12 by means of double sided adhesive tape. At the front edge 14b the front face 14d and the reverse face 14e intersect each other at an angle of 20°, and at the rear edge 14c the rear face 14f rises steeply from the reverse face 14e at right angles (see FIG. 4). The reverse face 14e may be subjected to hollowing out for lightening the weight as necessary.

Four first fins 15 extending in the fore-and-aft direction are projectingly provided on the front face 14d of the base part 14 so as to face outward in the vehicle width direction. The four first fins 15 are disposed so that the rear ends thereof are close to the rear edge 14c of the base part 14, and therefore the first fin 15 at an upper level is displaced rearward by about a half pitch with respect to the first fin 15 at a lower level. A single second fin 16 extending in the fore-and-aft direction along the upper edge 14a of the base part 14 is projectingly provided so as to face outward in the vehicle width direction. The length of the second fin 16 is larger than that of the first fins 15, the rear end thereof coincides with the rear edge 14c, and the front end thereof projects forward from the front edge 14b.

Figure 5:
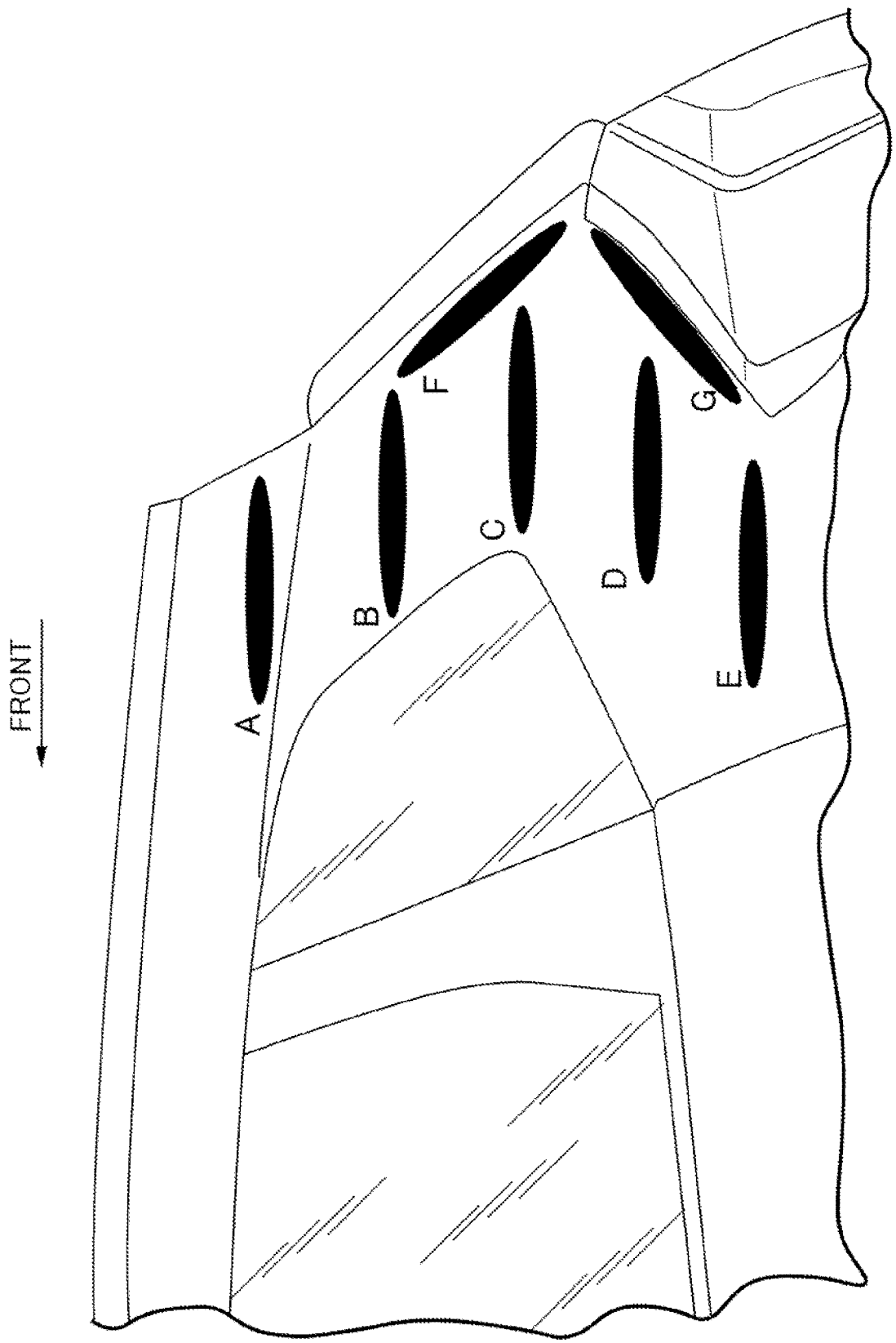
FIG. 5 is a view showing candidate positions for where a fin is to be mounted. (first embodiment)
Figure 6:
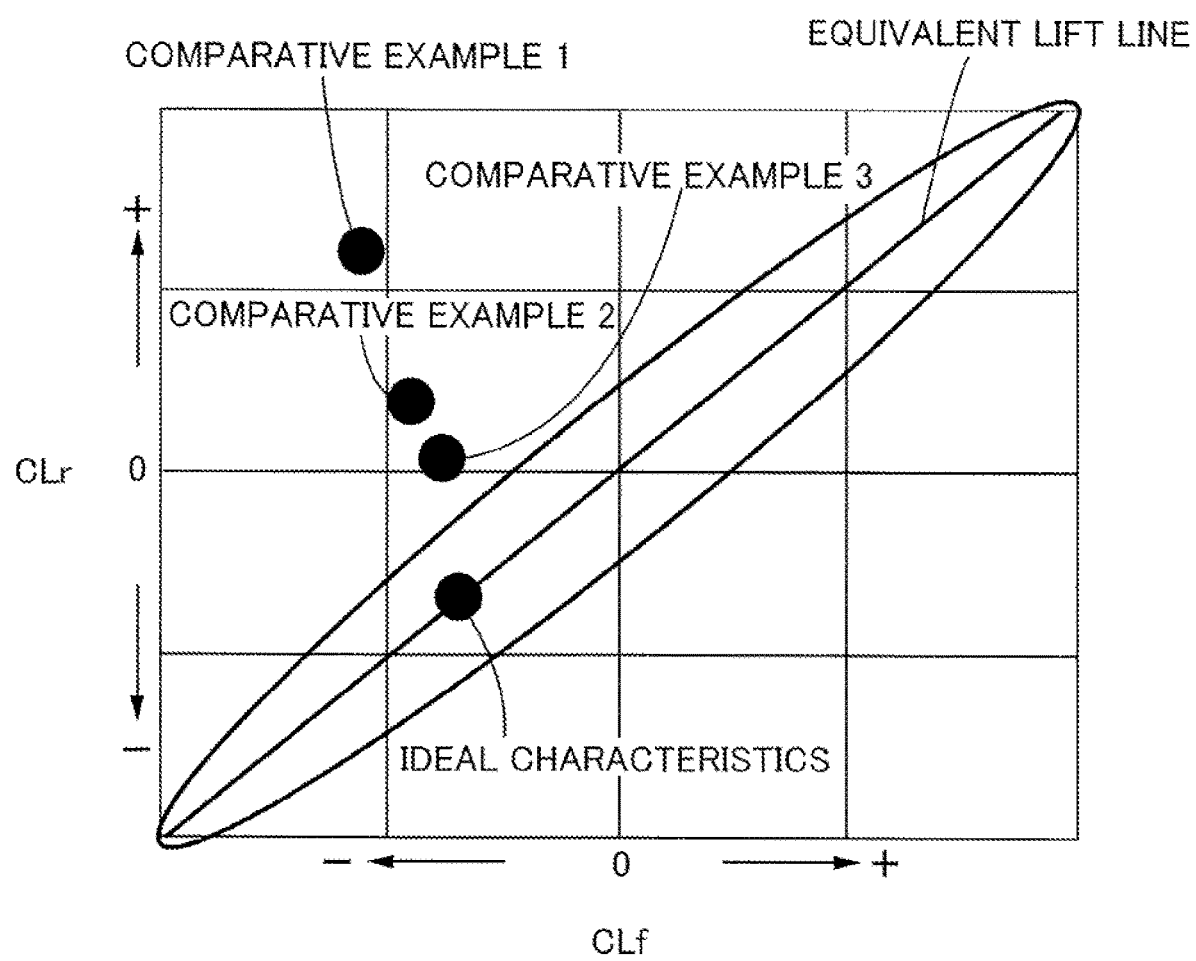
FIG. 6 is a graph showing the distribution of a lift coefficient CLf of a front part of the vehicle body and a lift coefficient CLr of the rear part of the vehicle body. (first embodiment)

FIG. 5 shows a test method that is carried out during development of the aerodynamic component 11 of the present invention; a fin is mounted on each of position A to position G on a side face of a rear part of a vehicle body, a travel test is carried out, and the effect is evaluated.

It has been found that when a fin-shaped aerodynamic component extending in the fore-and-aft direction is mounted at position A, position B, position D or position E, a contribution to vehicle straight-line travel is observed, but the effect is small. When an aerodynamic component extending in the fore-and-aft direction is mounted at position C, the vehicle straight travel is remarkably improved, and an effect in reducing the vehicle yaw angular velocity is observed. It has been found that when an aerodynamic component inclined from upper front to lower rear is mounted at position F, a turbulent vortex occurs in a vehicle body upper rear part; an effect in reducing the lift coefficient CLr of the vehicle body rear part is observed, but since the turbulent vortex is unstable the lateral deflection of the vehicle body increases. It has been found that when an aerodynamic component inclined from lower front to upper rear is mounted at position G, a turbulent vortex occurs in a vehicle body upper rear part, and an effect in remarkably reducing the lift coefficient CLr of the vehicle body rear part is observed, but since the turbulent vortex is unstable the lateral deflection of the vehicle body further increases.

The aerodynamic component 11 of the present embodiment is a combination of an aerodynamic component at position C and an aerodynamic component at position G, and includes the base part 14 corresponding to an aerodynamic component at position G and the second fin 16 corresponding to an aerodynamic component at position C. The aerodynamic component 11 generates a turbulent vortex in air flow passing the vehicle body upper rear part by means of the base part 14 corresponding to an aerodynamic component at position G, the lift coefficient CLr of the vehicle body rear part is decreased, and the ground load for the rear wheel is ensured, thus improving the handling stability. However, since the turbulent vortex generated by the base part 14 alone is unstable, there is the problem that due to an imbalance in turbulent vortex between left and right side faces of the vehicle body, lateral deflection is generated in the vehicle body. In the present embodiment providing the plurality of first fins 15 on the base part 14 stabilizes the turbulent vortex on the left and right side faces of the vehicle body to thus eliminate the imbalance between the left and the right, thereby preventing lateral deflection of the vehicle body and enhancing the stability toward an external disturbance, that is, stability toward poor conditions such as an irregular road surface or a side wind.

Moreover, in the aerodynamic component 11 of the present embodiment, due to the second fin 16 corresponding to an aerodynamic component at position C being provided, in cooperation with the first fins 15 the turbulent vortex on the left and right side faces of the vehicle body can be further stabilized, and lateral deflection of the vehicle body can be prevented, thereby further enhancing the stability toward external disturbance. Due to the turbulent vortex on the left and right side faces of the vehicle body being stabilized by means of the first fins 15 and the second fin 16, eddies going around from the vehicle body side face to the vehicle body rear face are reduced to thus suppress the occurrence of a dead air region, thereby minimizing any degradation in fuel consumption due to an increase in the pressure drag.

Furthermore, if the angle formed between the front face 14d and the reverse face 14e at the front edge 14b of the aerodynamic component 11 is too large, the turbulent vortex on the vehicle body upper rear part becomes excessively large, the lift coefficient CLr of the vehicle body rear part becomes smaller than the lift coefficient CLf of the vehicle body front part, and there is a possibility that the handling stability will decrease due to the balance deteriorating, whereas if the angle is too small the turbulent vortex on the vehicle body upper rear part becomes excessively small, the lift coefficient CLr of the vehicle body rear part becomes larger than the lift coefficient CLf of the vehicle body front part, and there is a possibility that the handling stability will decrease due to the balance deteriorating. However, in accordance with the present embodiment, since the angle is set at 20°, the lift coefficient CLr of the vehicle body rear part and the lift coefficient CLf of the vehicle body front part can be balanced so as to substantially coincide with each other (see ideal characteristics in FIG. 6), thus contributing to improving the handling stability to the maximum.

An embodiment of the present invention is explained above, but the present invention may be modified in a variety of ways as long as the modifications do not depart from the spirit and scope thereof.

For example, in the embodiment the aerodynamic component 11 is formed as a separate member and is mounted on the vehicle body, but the aerodynamic component 11 may be formed integrally with the vehicle body. Specifically, in a case in which the aerodynamic component 11 is provided on the rear pillar 12, the aerodynamic component 11 may be molded integrally with the rear pillar 12 when press forming it.

Furthermore, the base part 14 of the embodiment is disposed so as to be inclined from lower front to upper rear, but the same operational effects can be achieved by disposing the base part 14 so as to be inclined from upper front to lower rear.

Moreover, an automobile to which the present invention is applied is not limited to a hatchback type automobile, and the present invention may be applied to any type of automobile, including a sedan type.

The invention claimed is:

1. An aerodynamic component for automobiles, the aerodynamic component, which is disposed on a side face of an upper rear part of an automobile vehicle body and reduces a lift coefficient (CLr) of a vehicle body rear part, comprising a plate-shaped base part and a fin projectingly provided on a front face of the base part, wherein the base part gently increases in thickness from a front edge side to a rear edge side, and has at the rear edge a shape that rises steeply with respect to the side face of the upper rear part of the vehicle body.

2. The aerodynamic component for automobiles according to claim 1, wherein the aerodynamic component is disposed on a surface of a rear pillar of the automobile, and the rear edge of the base part, which is formed into a linear shape, is inclined from lower front to upper rear or from upper front to lower rear.

3. The aerodynamic component for automobiles according to claim 1, wherein the fin comprises a plurality of first fins extending in a fore-and-aft direction, and the plurality of first fins are arranged side by side in an up-and-down direction so as to be parallel to each other.

4. The aerodynamic component for automobiles according to claim 3, wherein the fin comprises a single second fin extending in the fore-and-aft direction, the second fin is disposed along an upper edge of the base part, and a length of the second fin in the fore-and-aft direction is larger than a length of the first fin in the fore-and-aft direction.

5. The aerodynamic component for automobiles according to claim 1, wherein the front face and a reverse face of the base part form an angle of about 20° at the front edge.

6. The aerodynamic component for automobiles according to claim 1, wherein the lift coefficient (CLr) of the vehicle body rear part that has been reduced by the aerodynamic component substantially coincides with a lift coefficient (CLf) of a vehicle body front part.

7. The aerodynamic component for automobiles according to claim 1, wherein the aerodynamic component is detachably fixed to the vehicle body.

8. The aerodynamic component for automobiles according to claim 1, wherein the aerodynamic component is formed integrally with the vehicle body.

* * * * *